(12) United States Patent
Harris et al.

(10) Patent No.: US 7,092,721 B2
(45) Date of Patent: Aug. 15, 2006

(54) REDUCING DELAY IN SETTING UP CALLS

(75) Inventors: John M. Harris, Chicago, IL (US);
Ronald T. Crocker, St. Charles, IL (US)

(73) Assignee: Motorola, Inc., Schaumburg, IL (US)

(*) Notice: Subject to any disclaimer, the term of this patent is extended or adjusted under 35 U.S.C. 154(b) by 90 days.

(21) Appl. No.: 10/894,506

(22) Filed: Jul. 20, 2004

(65) Prior Publication Data

US 2006/0019681 A1     Jan. 26, 2006

(51) Int. Cl.
*H04Q 7/20* (2006.01)
*H04B 7/00* (2006.01)

(52) U.S. Cl. ............... 455/455; 455/516; 455/517; 455/518; 455/519; 455/527; 455/520

(58) Field of Classification Search ........... 455/455, 455/516, 517, 519, 518, 520, 527
See application file for complete search history.

(56) References Cited

U.S. PATENT DOCUMENTS

| | | | |
|---|---|---|---|
| 5,465,394 A * | 11/1995 | Pinault et al. ............. | 455/517 |
| 6,012,096 A * | 1/2000 | Link et al. .................. | 709/233 |
| 6,636,745 B1 * | 10/2003 | Oprescu-Surcobe et al. ............. | 455/458 |
| 6,865,398 B1 * | 3/2005 | Mangal et al. ........... | 455/552.1 |
| 2002/0103999 A1 * | 8/2002 | Camnisch et al. .......... | 713/155 |
| 2002/0151319 A1 * | 10/2002 | Joeressen et al. ........... | 455/518 |
| 2002/0173325 A1 * | 11/2002 | Rosen et al. ................ | 455/518 |
| 2002/0173326 A1 * | 11/2002 | Rosen et al. ................ | 455/518 |
| 2002/0173327 A1 * | 11/2002 | Rosen et al. ................ | 455/518 |
| 2003/0003592 A1   | 1/2003 | Colvin, Jr. | |
| 2003/0144018 A1 * | 7/2003 | Minnick et al. ........... | 455/519 |
| 2004/0203793 A1 * | 10/2004 | Dorenbosch ............... | 455/445 |
| 2004/0219940 A1 * | 11/2004 | Kong et al. ................. | 455/518 |
| 2005/0032539 A1 * | 2/2005 | Noel et al. ................. | 455/518 |
| 2005/0070320 A1 * | 3/2005 | Dent ......................... | 455/516 |
| 2005/0085253 A1 * | 4/2005 | Mansour .................... | 455/519 |
| 2005/0239485 A1 * | 10/2005 | Kundu et al. .............. | 455/519 |
| 2005/0239487 A1 * | 10/2005 | Glass et al. ................ | 455/519 |

* cited by examiner

*Primary Examiner*—Joseph Feild
*Assistant Examiner*—Celeste Loftin

(57) ABSTRACT

A method (600) and apparatus (700) for reducing delay associated with a call set-up for a call between an originating communication unit (120) and a target communication unit (121–124) in a radio access system (RAS) (101) is described. A call is initiated with a target communication unit prior to a channel assignment. A first latency (411) between an initiation time and a time when the target is capable of receiving a notification of the call on a first channel (410) is estimated and a second latency (421) between the initiation time and a second time when the target is capable of receiving the notification on a second channel (420) is estimated. Addresses associated with the target can be sent to the radio access system on the first channel or the second channel based on the estimated first latency and the estimated second latency.

17 Claims, 5 Drawing Sheets

REDUCING DELAY IN SETTING UP CALLS

FIELD OF THE INVENTION

The present invention relates in general to calls for communication units in wireless communication systems and related equipment such as mobile receivers, transceivers, base units, and more specifically to a method and apparatus for reducing delay associated with setting up certain kinds of calls, such as private and group calls or delivering various types of messages.

BACKGROUND OF THE INVENTION

Group calls have historically been an important feature in radio dispatch services such as police and rescue services. More recently, such features have been made available to communication units in wireless communication networks by some service providers. In addition to normal cellular network services, some service providers maintain an entirely separate wireless or cellular network having frequencies and equipment dedicated to specialized services. Some specialized networks are based on the Integrated Digital Enhanced Network developed by Motorola, Inc. of Schaumburg, Ill. and use, for example, the 800 MHz portion of the radio spectrum assigned to specialized mobile radio (SMR) service. In accordance with this network, for example, slotted TDMA technology is used to provide normal cell phone voice communications, messaging services such as pager and e-mail, data services such as wireless Internet and private data networks, digital two-way radio or dispatch services such as one-to-one and group communication. Group calls rely on a Push-To-Talk (PTT) call initiation commonly used in dispatch radio systems requiring a speaker in an active communication to press a talk button before talking and to release the talk button when finished talking. A listener can likewise press and release a talk button to respond. When making a group call in a PTT environment, a button can be pressed on a communication unit configured with the number or numbers of the target or targets for the group call to establish a call or session with, for example, the above noted network. The network determines that the call is a dispatch or group call rather than an interconnect call such as a normal cell phone call. The network then determines if the call is a one-to-one or a group call. If the call is a group call, the network provides the digital voice packets to each target in the group based on an address associated with each of the targets. A list containing addresses of targets may be sent to the network in a variety of different methods, including: using Short Data Burst (SDB) messages over Access Channel/Enhanced Access Channel (ACH/EACH), SDB messages over a Reverse Common Control Channel R-CCCH, in the origination message, and over the traffic channel itself. When the PTT button of the originating communication unit is pressed, the targets in the list are paged whereupon they may join the call by responding and this will be indicated with a Talk Permit Tone (TPT). Thus the setup delay for initiating the call is the time from PTT to the first TPT at the originating communication unit.

Problems can arise in that, in the typical slotted environment associated with, for example certain versions of Integrated Digital Enhanced Networks, communication units only wake up periodically, such as every 0.64, 1.28, 2.56, or 5.12 seconds to check for incoming pages including pages associated with the group call. Thus, significant delay may be incurred between when the first TPT is issued and when other targets join the call. Further problems involve audio clipping occurring while other targets are joining the group call after the first TPT. Thus, if setup delay is too long, audio delay and clipping will persist for a corresponding amount of time.

Several sources of delay are possible. For example, address transfer time for communication units is long, for example, from approximately 240 to 900 msecs to send 10 addresses, thus target communication units may go back to sleep during address transfer resulting in waiting an extra slot cycle and encountering more audio clipping. Further, if address data is sent across a traffic channel, an extra slot cycle of delay may result due to waiting for channel set up. If address data is sent prior to the traffic channel being built or setup, extra delay will result from a slot cycle time longer than a channel build time. It should be noted that in conventional group call set up, target addresses associated with address data are randomly ordered and prioritized during address transfer, causing an unnecessarily large number of targets to wait an extra cycle. The last address sent up, for example will have about a 70% chance of having to wait one additional cycle, or another 1.28 seconds, before getting a page associated with the group call.

Clearly a need exists for methods and apparatus capable of reducing the delay associated with a call set up.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF PREFERRED EMBODIMENTS

Figure 1:
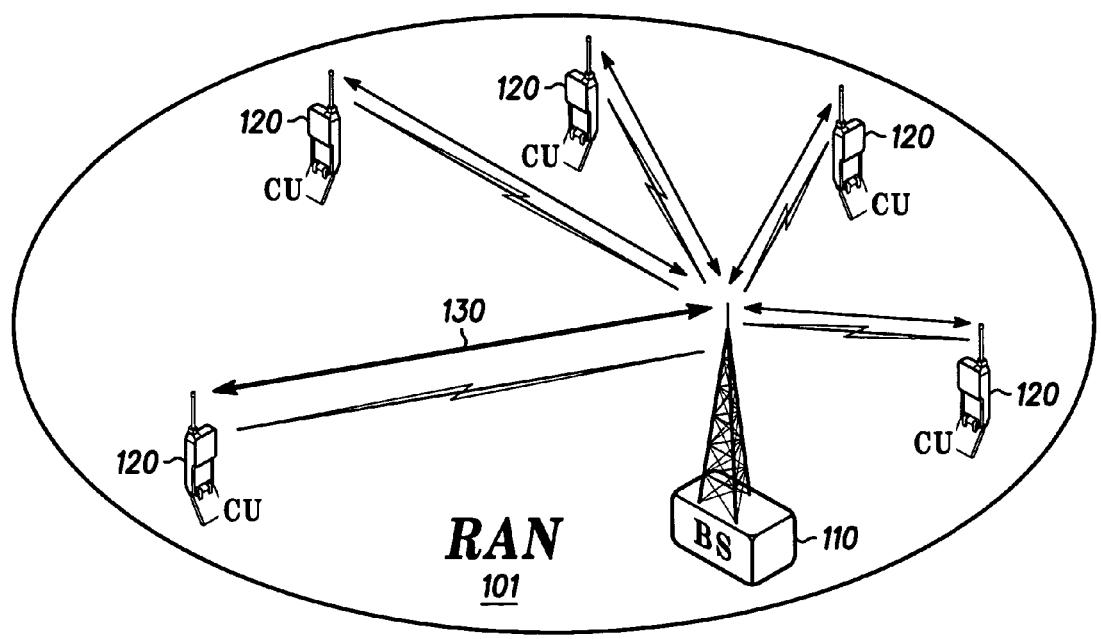
FIG. 1 is a diagram depicting an exemplary radio access system (RAS), a plurality of exemplary communication units, an exemplary radio access network, and an exemplary core network.

In overview, the present disclosure concerns the establishment of a group call between an originating device in a Radio Access System (RAS), such as a stationary or fixed mobile receiver, communications unit, and the like and one or more target communication units in the RAS, and a method and apparatus for reducing group call set-up anomalies such as delay. It should be noted that conventional methods of establishing group calls or private calls typically do not address or control the manner in which target addresses are handled by the system. In accordance with various exemplary embodiments, the present invention allows sorting or otherwise arranging or ordering of target addresses for transfer over different types of channels in accordance with, for example, a first estimated latency associated with an initiation time such as a PTT time or a time after a PTT time when a certain amount of processing can occur, and a time at which a notification such as a page message on a forward paging channel can be sent to respective communication units associated with the target addresses. The time is based on factors such as a known wake up time for the target, channel build time for a dedicated traffic channel, or the like and can result in, for example, a decision as to whether use of an access channel or a traffic channel or a combination of both the access channel and the traffic channel, to transfer target addresses will result in the most significant delay reduction.

It will be appreciated that ordering target addresses, determining transfer channels, and otherwise reducing delay may be performed in a dedicated device such as a communication unit having a dedicated processor, a processor coupled to an analog processing circuit or receiver analog "front-end" with appropriate software for performing a communication unit function, an application specific integrated circuit (ASIC), a digital signal processor (DSP), or the like, or various combinations thereof, as would be appreciated by one of ordinary skill. Memory devices may further be provisioned with routines and algorithms for operating on input data and providing output such as operating parameters to improve the performance of other processing blocks associated with, for example, reducing delay, and otherwise appropriately handling the call set-up.

It will further be appreciated that communication units or wireless communications units may refer to subscriber devices such as cellular or mobile phones, two-way radios, messaging devices, personal digital assistants, personal assignment pads, personal computers equipped for wireless operation, a cellular handset or device, or the like, or equivalents thereof provided such units are arranged and constructed for operation in accordance with the various inventive concepts and principles embodied in, for example, exemplary communication units and methods for reducing delay as discussed and described herein.

The principles and concepts discussed and described may be particularly applicable to communication units, devices, and systems providing or facilitating voice communications services or data or messaging services over wide area networks (WANs), such as conventional two way systems and devices, various cellular phone systems including analog and digital cellular, CDMA (code division multiple access) and variants thereof, GSM (Global System for Mobile communications), GPRS (General Packet Radio System), 2.5 G and 3 G systems such as UMTS (Universal Mobile Telecommunication Service) systems, integrated digital enhanced networks and variants or evolutions thereof. Principles and concepts described herein may further be applied in devices or systems with short range communications capability normally referred to as W-LAN capabilities, such as IEEE 802.11, Bluetooth, or Hiper-LAN and the like that preferably utilize CDMA, frequency hopping, orthogonal frequency division multiplexing, or TDMA access technologies and one or more of various networking protocols, such as TCP/IP (Transmission Control Protocol/Internet Protocol), IPX/SPX (Inter-Packet Exchange/Sequential Packet Exchange), Net BIOS (Network Basic Input Output System) or other protocol structures.

As described in greater detail hereinafter, various inventive principles are employed to provide a method for reducing delay associated with a call set-up for a call between an originating communication unit and a target communication unit in a radio access system (RAS). In an elegant embodiment associated with a private call set up, a call may be initiated or otherwise originated between an originating communication unit and a target communication unit, for example, prior to a channel assignment for the originating communication unit. A first latency can be estimated between a time when the call is initiated and a time when the target communication unit is capable of receiving a notification such as a page message on a forward paging channel associated with the call set-up if the address of the target is sent to the RAS on a channel such as an access channel and includes a time for sending addresses and sending a traffic channel request. A second latency can also be estimated between the time when the call is initiated and a time when the target communication unit is capable of receiving a notification such as a page message on a forward paging channel associated with the call set-up if the target address is sent to the RAS on a different channel such as a traffic channel and includes a time for building the traffic channel including sending a traffic channel request and receiving a channel assignment from the network infrastructure. It will be appreciated that the originating communication unit in some embodiments can obtain and store information associated with wake up times for target communication units and will further be synchronized in a manner known in the art with a system time by which other time values, such as wake up times are measured. Once the latency is estimated, an address associated with the target communication unit may be sent to the radio access system on one of a first channel and a second channel based on the estimated latency such that the delay time, e.g. the time from origination until a target unit can be paged, is reduced or otherwise minimized. In other embodiments, the private call scenario can be adapted such that the call can includes a group call.

In accordance with other exemplary embodiments, e.g. where the call is a group c all, the target communication unit is preferably one of a plurality of target communication units associated with the group call. Each of the plurality of target communication units has information associated with it such as a respective address. A respective latency may be estimated between the time when the group call is initiated and a respective time when each of the plurality of target communication units is capable of receiving the page associated with the call set-up as noted above if the addresses are sent to the RAS on the first or second channel. The respective addresses associated with the plurality of target communication units may then be sent to the RAS on either the first channel or the second channel based on the respective latency, e.g. such that the delay time, e.g. the time from origination until one of the plurality of target units can be paged, is reduced or otherwise minimized. In the group call context, the addresses may be sent to the RAS to minimize the delay time associated with the call set up and will involve, for example, sending some addresses on a first channel such as a contention based channel or access channel, while some addresses may be sent on a second channel such as a dedicated traffic channel once the traffic channel is established. It will be appreciated by one of ordinary skill in the art that latencies may be one or more of an estimated, determined or otherwise known time between a first time such as a Push To Talk (PTT) time, a time when the PTT button associated with the originating communication unit is pressed, and a second time such as a wake up time, a Talk Permit Tone (TPT) time, or a time when a response to the page associated with the call set up is received. The first time, the PTT time may be compared with a wake up time for the target communication unit using a time value associated with the RAS, such as a global synch time, and a slot offset time associated with the target communication unit. By estimating latencies, a decision can be made regarding which of the first channel or the second channel the address of the particular target can be sent on. In the case of multiple targets, the channel decisions can be made for all of the targets and then the addresses can be sent together on respective channels.

Further in accordance with various exemplary and alternative exemplary embodiments, the RAS preferably includes a Code Division Multiple Access (CDMA) RAS, a Global System Mobile (GSM) RAS, Universal Mobile Telecommunication System (UMTS) RAS, a Data Only (DO) RAS, a High Rate Packet Data (HRPD) RAS, a Wireless Local Area Network (WLAN) RAS, or an Evolution Data Voice (EVDV) RAS.

In accordance with another exemplary embodiment, delay may be reduced by a method associated with a group call setup for a group call between an originating communication unit and a plurality of target communication units in a radio access system (RAS). A list of addresses associated with the plurality of target communication units may be sorted according to a latency value between a first time such as a PTT time and a second time such as a wake up time associated with each of the plurality of target communication units. The list may be sorted according to one or more first addresses to be transmitted to the RAS over a first channel and one or more second addresses to be transmitted to the RAS over a second channel in a manner to be described in greater detail hereinafter. The sorting can be performed when the group call set-up is impending such that any updates made to information associated with the list just before call set up or PTT can be included in the estimation of latencies. The group call between the originating communication unit and the plurality of target communication units is originated at the originating communication unit, such as at the first time or PTT time, by transmitting the first addresses to the RAS over the first channel and transmitting the second addresses to the RAS over the second channel. The second time as also noted above, includes a wake up time, a Talk Permit Tone (TPT) time, or a time when a response to a page associated with connecting the group call is received, each as associated with each of the plurality of target stations. Also as noted above, the first channel includes a contention based channel such as an access channel and the second channel includes a dedicated channel such as a dedicated traffic channel. The RAS can include the various forms of networks noted earlier.

In accordance with still other exemplary embodiments, an apparatus in a radio access system (RAS) capable of participating in a call can be used to reduce delay. An exemplary apparatus includes an interface such as an RF interface or the like, capable of coupling to the RAS and a target communication unit. The apparatus may also include, a processor and memory and the memory preferably contains instructions such as a software program, software application or the like, which, when executed causes the processor to estimate a first time delay associated with completing the call with the target communication unit, such as a time when the target is capable of receiving a page on, for example, a forward paging channel, if an address of the target communication unit is transmitted to the RAS over a first channel, such as an contention based access channel or the like, and estimate a second time delay if the address is transmitted over a second channel such as a dedicated traffic channel or the like.

The processor further initiates the call, after, for example, sensing or otherwise processing input associated with the PTT button being pressed, by sending the address associated with the target communication unit to the RAS on the first channel or second channel based on the first time delay or the second time delay. It will be appreciated that the first time delay and the second time delay can include an elapsed time between a time when the call is initiated, such as a PTT time, and a wake up time, a Talk Permit Tone (TPT) time, or a time when a response to the page associated with connecting with the group call is received. It will further be appreciated that the call may include a group call, and the target communication unit can be one of a plurality of target communication units associated with the group call.

Accordingly, the processor can estimate a respective first latency associated with when each of the plurality of target communication units is capable of receiving a page associated with the call if address information associated with the each is sent on a first channel and a respective second latency associated with when each of the plurality of target communication units is capable of receiving a page associated with the call if the address information associated with the each is sent on a second channel. The address information associated with the each of the plurality of target communication units can be sent to the RAS on the first channel or the second channel based on the respective first latency or the respective second latency.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

In accordance with the current IS-2000 standard, such as outlined for example in the publication by the Telecommunication Industry Association, TIA/IE/A/IS-2000 Series, Rev A, CDMA 2000® Series (2000), committee TR45.5, published Mar. 1, 2000, a mobile station or communication unit can operate in a slotted mode while in the Idle State, in order to conserve battery life. When operating in the slotted mode, the communication unit "wakes up" periodically, for example to check for a page, and otherwise conserves power or "sleeps" while in the Idle State. The communication unit "wakes up" once per slot cycle, checks to see if any messages are pending, and goes back to sleep if not. It will be appreciated that the longer the slot cycle interval, the longer the standby battery life for the communication unit. Problems arise however in that the longer slot cycle interval also translates to a longer expected call setup time since it may take a full slot cycle interval to process a page if received early in the cycle, and if the page is pending but not sent during a slot cycle as part of a group call set up, it could take upwards of two slot cycles or possibly more between when a page is deemed necessary, at group call origination, and when the page is actually sent.

To better appreciate an exemplary scenario, consider that the length of a slot cycle T, in units of seconds, is given by $T=1.28(2^i)$, where i is the selected slot cycle index, and 1.28 is a typical slot cycle time in seconds. A communication unit supporting operation in the slotted mode must use a slot cycle index no greater than the lesser of 1) a preferred slot cycle index as is preferably stored in the communication unit's permanent memory; and 2) a maximum slot cycle index typically broadcast by a base station in the MAX_SLOT_CYCLE_INDEX field of the System Parameters Message overhead message. Given that the slot cycle index (SCI) i has a range of 0 to 7, the slot cycle T using the relation described above, has a range of 1.28 seconds to 163.84 seconds. Thus, for a communication system or RAS with a SCI=1, each communication unit will wake up every 2.56 seconds. By way of illustration, a Verizon Wireless system operating in the greater Chicago Metropolitan area uses a MAX_SLOT_CYCLE_INDEX value of 2, an IS-2000 communication unit will use 2 as the preferred slot cycle index, resulting in a slot cycle length T for the communication unit of 5.12 s.

In addition to slot cycle and associated wake up time interval concerns, a certain amount of time is further required to send a target address for each target communication unit in a group call. The amount of extra delay depends on the channel type being used and the target identified type being used such as "friendly name" vs. an Urban Fleet Member Identifier (UFMI), or an International Mobile Subscriber Identifier (IMSI). Addresses can be sent using a Short Data Burst (SDB) message on an access channel (ACH) or extended access channel (EACH). If SDB messages are used to send target addresses, the time per address given that one address is sent per SDB message could be very large since the ACH/EACH window size is 1 meaning that a subsequent SDB message with a new address can not be sent until the previous SDB message has been acknowledged or ACKed. One solution could be to combine several addresses in one SDB message.

In order to combine addresses into one SDB message the payload capacity of a given SDB message on the access channels, such as the R-ACH and the R-EACH must be considered. The physical limitations for the R-ACH are 4800 bps, 20 ms frames, with 8 bits used for an encoder tail. The slotted structure overlay provides a brief preamble period, for example to help a base station detect and decode the signal, and a modest number of payload frames. Using a recommended 6 payload frames, each access burst or SDB has 528 bits of user content from which must be subtracted 120 bits for Link Access Control (LAC) layer overhead, 22 bits for Data Burst Message overhead, 24 bits for Short Data Burst overhead, 48 bits for Point-to-Point Protocol (PPP) overhead, and 24 bits for Header Compression overhead as outlined in IETF RFC 2508, leaving a net payload capacity of ≦36 bytes. The remaining payload capacity can be used for application protocol and data. It can also be noted that PPP framing requires octet-stuffing to avoid certain byte patterns which may further reduce payload capacity.

Similarly, on the R-EACH, the payload capacity of a given access burst or SDB may be increased, since the physical rate limitation is raised to 9600 bps for the R-EACH. Using computations as above, adjusted for R-EACH and using the same capsule size (6 frames), the net payload capacity is 108 bytes.

Given the payload size it is useful to determine how many target addresses can fit in a given SDB. For UFMI and IMSI addresses 4 octets can be used, while "friendly" addresses of the form "name@host" are substantially longer and require more capacity. For example, the addresses "John.Doe@companyXYZ.com" are each 24 octets or 21 if 7-bit packed ASCII format is used. Since it may be possible to further compress the addresses in accordance with various exemplary embodiments, 18 octets may be used as an exemplary mean address size. Accordingly, each ACH SDB message can be expected to carry no more than 2 addresses in around 180 ms and each EACH SDB message can be expected to carry no more than 6 addresses in around 140 ms. Thus, when using SDB messaging to transfer addresses, it can be expected that the address transfer time is approximately 90 ms or ~24 ms per target to send the target address to the network.

It should also be noted that an SDB message is required to be a complete IP packet or a segment of an IP packet. Sending multiple target information by segmenting corresponding IP packets across multiple SDBs should not induce any problems with lost segments or net delay in getting the information across to the network. However, because each SDB message must be positively acknowledged before the next one can be sent, the particular content of the message is of less concern than the number of messages needing to be sent. For example, segmenting a single packet containing target address information over multiple SDB messages causes additional delay since the information can not be delivered until all segments have been received by the network. Thus it is more practical to send target information using SDB messages where each SDB contains a single, complete IP packet. It will be appreciated that header compression can be used to support more space for target identifiers.

Consider a scenario where an originating communication unit wants to establish a group call with 10 targets each having a different wake up time. In each case, the wake up time can be anywhere between 0 and a maximum of as noted above 163.84 seconds, although a more reasonable maximum time is around 1.28 seconds. Sending the 10 addresses associated with the targets could take between 240 ms and 900 ms using SDB messages, or much longer if a significant number of errors occur on the ACH/EACH. If the originator randomly orders the target addresses as they are sent to the network, the last address sent will have around an 18.75% (240 msec/1.28 secs) chance or around a 70% (900 ms/1.28 s) chance of having to wait one additional cycle or another 1.28 seconds, before getting a page from the network associated with the group call. Although the respective lengths of the exemplary intervals used above are 240 msec and 900 msec, the length of time over which the target addresses may be sent, can vary depending, for example, on use of SDB messages or reconnect messages such as origination messages with target info payloads. The time can also vary depending on the use of a traffic channel (TCH) to send target addresses, for example, after the traffic channel is setup.

In an exemplary scenario where traffic channel setup time is short relative to the slot cycle time, analysis shows that use of the traffic channel can reduce the audio delay, the time during which audio may be clipped, by an average of around 120 msecs for each target. The reduction is further relatively insensitive to the number of targets, particularly for cases between 5 and 10 targets as will be described in greater detail hereinafter. In other exemplary scenarios where a target is paged, for example, based on an address sent using an SDB while the traffic channel is being setup, the order of addresses is not as important when, for example, channel setup time is long relative to the slot cycle time. It should be noted however, that channel setup time is typically around 1 second in accordance with many existing systems or RANs and continues to shrink. In contrast, a typical slot cycle is generally at least 0.65 seconds, and is often as high as 5.12 seconds making address ordering an increasingly important method for reducing delay.

In accordance with another exemplary scenario, where all target addresses are sent only after an originating communication unit is on an established traffic channel, the average total PTT to audio clipping plus delay savings is around 100 msecs for 5 targets, and 200 msecs for 10 targets with the audio delay savings resulting from a combination of reduced audio delay and reduced audio clipping. The $90^{th}$ percentile PTT to TPT delay savings is around 150 msecs for 5 targets, and 300 msecs for 10 targets, and the average PTT to TPT delay savings is around 100 msecs for 5 targets, and 200 msecs for 10 targets.

It will be appreciated that the time until each target communication unit wakes up next is a function of and can be determined or otherwise known based on the current CDMA time. An originating communication unit thus should know the target's slot cycle length and offset, T and PGSLOT respectively, as described, for example, in IS-2000.5, section 2.6.2.1.1.3.1. The offset is preferably computed based on the communication unit's ID. In accordance with various exemplary embodiments therefore, the originating communication unit can calculate whether sending each additional target address prior to, for example, requesting and building its own traffic channel, will reduce the total time until the corresponding target is paged. Thus, if sending a target address prior to establishing the traffic channel, such as in an SDB message on the access channel, will not reduce the total time until the target is paged, then the target address can be sent after the originating communication unit is on a traffic channel, without incurring the cost of additional delay in paging the target. Additional benefits of transferring addresses on the traffic channel may also arise including that the originator will be on the traffic channel earlier where it can more rapidly send remaining target addresses in a more efficient way based on for example power control associated with traffic channel communication. Target communication units can further play their TPTs earlier, typically as soon as they get on channel, since by the time a target communication unit gets on channel, at least one page response has been received. Target communication units can further begin sending audio earlier.

Thus, it will be appreciated that much greater costs are associated with sending target addresses over the access channel than sending target addresses on the dedicated traffic channel. Extra radio frequency (RF) costs result from the need to send around 3 to 5 times more power per information bit over an access channel, as compared to a power controlled dedicated channel. Extra time can result from a combination of overhead, 50% or more, when sending target addresses via SDB messages on an access channel, and lower bit rates of around 4800 to 9600 bps, which are common on access channels. On a dedicated channel, 3 to 5 times higher bit rates can be achieved with the same RF costs, for example, in accordance with EVDV, and, further, audio can be sent in parallel with additional target addresses over a dedicated channel.

Thus in accordance with various exemplary embodiments, the initiation of a selective dynamic group call can be detected and then the delay until the network can send a page or notification to the next target unit with a corresponding next address is estimated using known latencies. For each target communication unit, $T(i)$—the time when communication unit i will wake up next, is preferably estimated using system time & PGSLOT offset. It will be appreciated that offsets/IMSIs for frequently called targets could be pushed to an originator communication unit by a 'chat sever' during earlier calls or via some other broadcast method as would be appreciated by one of ordinary skill in the art. Further, PGSLOT and slot cycle information can be exchanged among communication units during calls. Targets may further be sorted or scheduled, as will be described herein below, to minimize the number of target communication units waiting an extra cycle.

In order to schedule or sort the list of targets, the next communication unit to wake up, i.e. communication unit j, may be determined from the known information where the $T(j)$ results in a minimum time delay. It can then be determined whether scheduling communication unit j next will allow it to be paged at time TO). If not, the wake up time associated with communication unit j can be incremented by 1 cycle, otherwise, communication unit j can be scheduled next. Communication unit j can be scheduled in the same packet or SDB message as the previous address if doing so will not affect the paging time for the previous address. Otherwise communication unit j can be scheduled after the traffic channel is built, if doing so will not delay the reception of the page. Sorting or scheduling can be repeated until all target communication units have been scheduled.

It will further be appreciated that the present invention, in accordance with various exemplary embodiments, takes into consideration that not all targets will have the same 'cycle length' or Slot Cycle Index (SCI). In some instances, the SCI will be exceptionally long and in other instances it will be very short. If a target address to be sent is for a communication unit with a short SCI, one that will wakeup very soon, and no other target addresses need to be sent immediately, then in accordance with various exemplary embodiments, a "copy" of the target addresses can be sent in a separate packet, message or the like, to ensure that the target will not miss a page when it wakes up, for example in the event that the first packet or message containing the target address is lost or corrupted. Even though the corrupted message or packet will be retransmitted through retransmission mechanisms associated with the prevailing protocol, the mechanisms are slow and the address may be sent after the wake up period, thus the redundancy associated with sending the second copy is additional assurance that the page will be received in time. When sending packets on the traffic channel, the retransmission mechanism can be a message referred to as automatic repeat request (ARQ) issued by the recipient to notify the sender that retransmission of one or more corrupted packets is required under the prevailing protocol, such as, for example, Radio Link Protocol (RLP) in CDMA 2000, and Radio Link Control (RLC) in UMTS and GPRS systems.

It will be appreciated that various exemplary and alternative exemplary embodiments in accordance with the present invention may be implemented in an exemplary communication unit by way of, for example, installation of a software baseline or the like and execution of a corresponding software program, programs, modules, routines, or the like. The exemplary communication unit is preferably configured with an IMSI or PG slot and can be so configured with little or no infrastructure impact. It will further be appreciated that the degree of benefit associated with various exemplary embodiments, will depend on a variety of factors associated with the diversity of RAS, RF, or the like technologies. The specific cases and example described herein are provided as representative and illustrative in order, for example, to quantify the attendant benefits.

Some approaches, such as speculative paging—placing a target on channel in advance of a PTT by an originating communication unit may reduce the benefits. However, fewer systems are expected to use speculative paging, because of inefficient use and consumption of resources. Instead, a modified speculative solution is contemplated where targets are speculatively given a RSCI (reduced slot cycle index). In such a scenario, the techniques described herein may be of particular use and may further be useful in RANs designed in accordance with RF technologies including CDMA 2000, GSM, UMTS, EVDV, Integrated Digital Enhanced Networks, & Wideband Integrated Digital Enhanced Networks, ICPD/Diamond dispatch over CDMA, GPRS & UMTS PSD solution, Winphoria dispatch over PSD and CSV solutions, where communication units associated with the RAS wake up periodically to check for incoming pages, with some offset with benefits varying with slot cycle time and channel build time.

Figure 2:
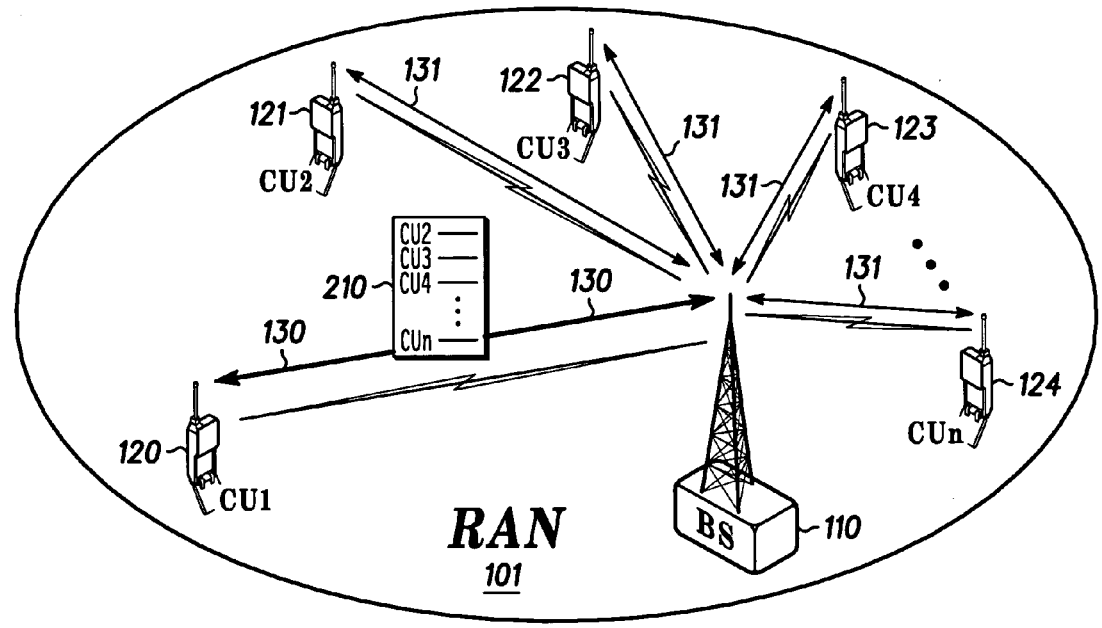
FIG. 2 is a diagram further depicting the exemplary RAS of FIG. 1, with the transfer of an exemplary list of target addresses.

Referring to FIG. 1 and FIG. 2, system diagrams 100 and 200 include a Radio Access Network (RAS) 101, such as an Integrated Digital Enhanced network, with base station 110 or like network infrastructure, and one or more communication units 120 capable of communicating over an air interface 130 on which communications can proceed according to a protocol such as the various protocols noted above. It will be appreciated that one of the communication units 120 may originate a private or group call over air interface 130 in a manner to be described in greater detail, by, inter alia, sending a list of target addresses such as list 210. It will be appreciated that some or all of the target addresses contained in list 210 may be sent on an access channel (ACH) if a dedicated channel has not been established. A channel request message may further be sent on the ACH and if the dedicated channel or traffic channel (TCH) will be available in time, meaning if the TCH can be established before the next wake up time associated with the respective communication units, additional addresses may be sent on the TCH. Once the addresses are received by base station 110, pages can be sent at the appropriate time, such as the wake up time for respective communication units, on, for example, a forward paging channel although other notification approaches may be used.

Figure 3:
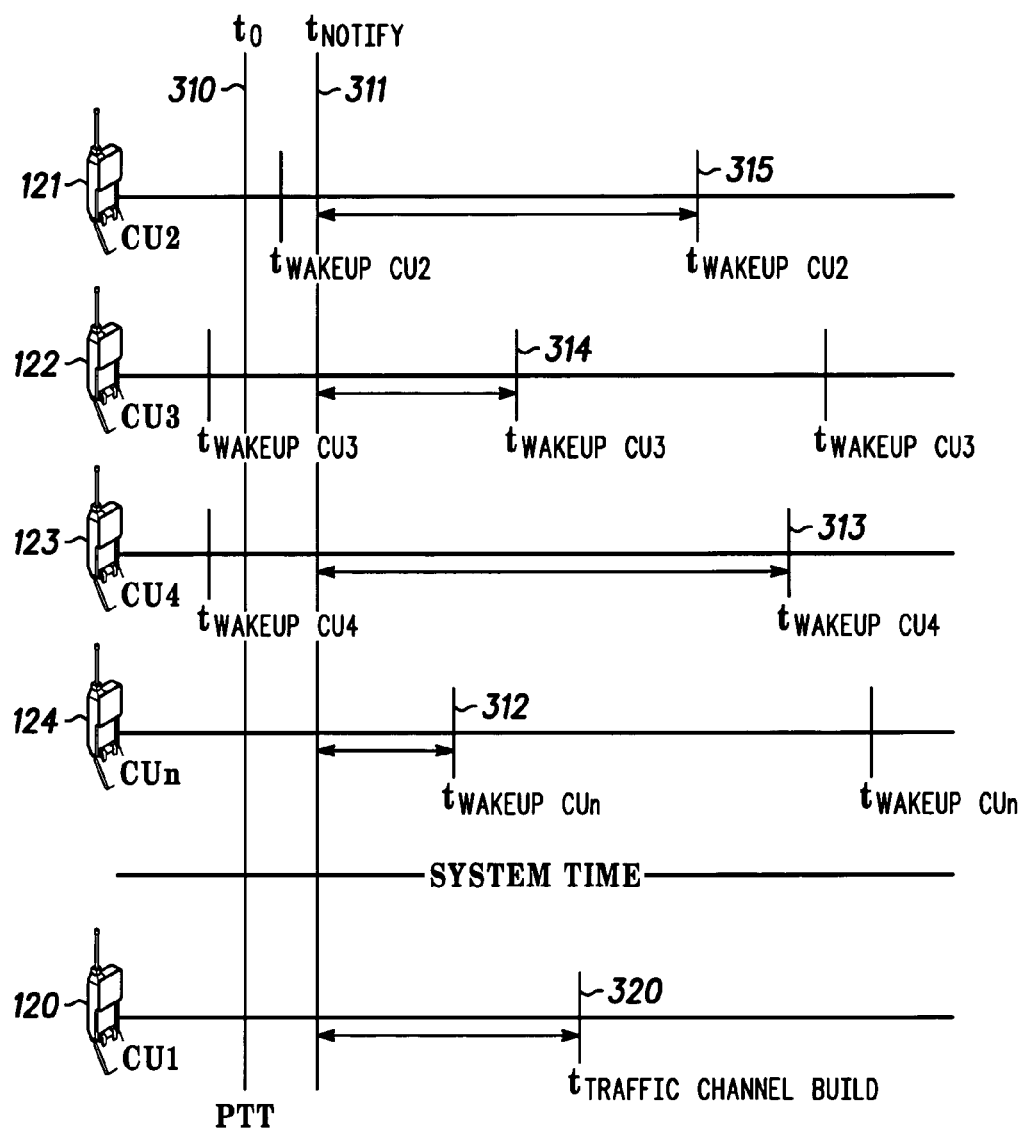
FIG. 3 is a timing diagram depicting exemplary timing relationships between RAS entities capable of participating in a group call.

In FIG. 3, a diagram 300 includes timing relationships for various communication units (CU) capable of being addresses in a private or group call. If CU1 120 for example is the originator of a private or group call to one or more of CU2 121, CU3 122, CU4 124, and CU n 124, various considerations can be made to reduce delay associated with the call set up as will be described. At $t_0$ 310, which can be, for example, a PTT time, or a time when a PTT button or the like is pressed indicating a desire on the part of the operator of CU1 120 to initiate a call, various procedures, processes, or the like may be initiated in accordance with various exemplary embodiments in order to estimate latencies after certain basic timing considerations are met, for example, at $t_{NOTIFY}$ 311. It will be appreciated that at $t_{NOTIFY}$ 311, CU1 120 will have checked overhead messages and an access channel slot delay period will have expired whereupon a message such as a Short Data Burst (SDB) message can be sent over the ACH. During the period from $t_0$ 310 to $t_{NOTIFY}$ 311, calculations, heuristics, or the like may be executed to estimate latencies associated with sending certain target addresses over the ACH, to be included in the SDB at $t_{NOTIFY}$ 311. Such calculations or the like can first include a determination of the length of time to send addresses over the ACH using for example an SDB message, which takes into account factors such as the wake up times for target CUs. For example, it can be seen that CU2 121 has a wake up time $t_{wakeup\ CU2}$ 315, CU3 122 has a wake up time $t_{wakeup\ CU3}$ 314, CU4 123 has a wake up time $t_{wakeup\ CU4}$ 313, and CU n 124 has a wake up time $t_{wakeup\ CU\ n}$ 312.

In a conventional group call context, all addresses would be sent, for example, on the ACH in a SDB message along with, for example, a traffic channel request, with no consideration given to whether such an action would result in certain CUs receiving pages during later wakeup intervals than would otherwise be necessary. Thus part of the calculation of latencies will include the earliest time a page can be received for one or more of CU2 121–CU n 124 if the respective addresses are sent in a SDB message on the ACH taking into account the wake up times as noted above. It will be appreciated that possibly only some of the addresses can be sent on the ACH and that, particularly when the address list is long, the determination can be coarse or fine based on the processing power of the originating CU as manifested in the time needed to evaluate, for example, all different permutations of wake up times and the like. It will be appreciated that one approach would be to sort the target list, for example, from soonest wake up time to latest wake up time from, for example, $t_{NOTIFY}$ 311. After sorting, the list can be evaluated as to which target CUs wake up after $t_{NOTIFY}$ 311, which is the earliest time an address can be sent on the ACH, and which target CUs wake up after, for example, a traffic channel can be built. Those target CUs waking up after the traffic channel is established can be notified by sending the addresses over the traffic channel as will be described.

Figure 4:
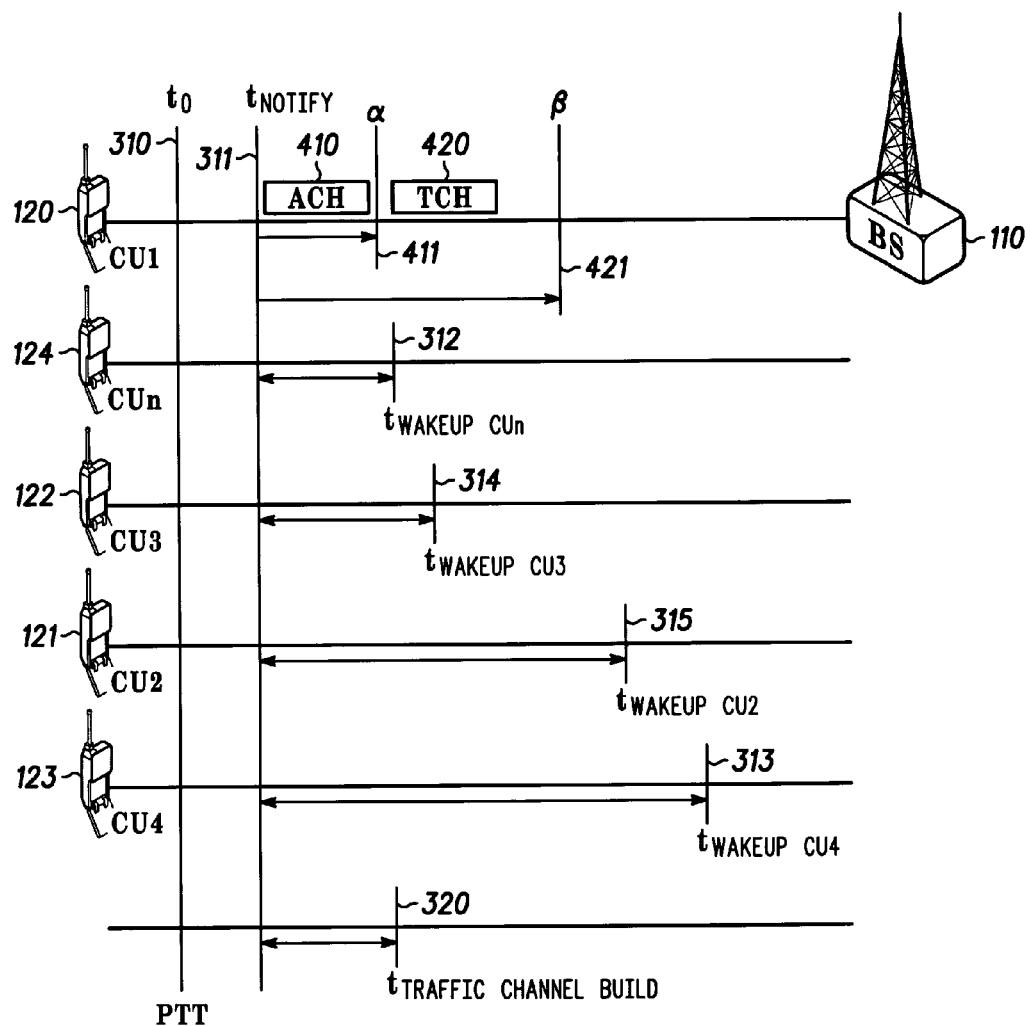
FIG. 4 is a timing diagram further depicting exemplary timing relationships between RAS entities and ordered addresses associated with communication units capable of participating in a group call.

Thus, in FIG. 4, it can be seen in an exemplary timing diagram 400, that during, for example, the interval between $t_0$ 310 and $t_{NOTIFY}$ 311, a first latency α 411 and a second latency β 421 can be calculated. First latency α 411 preferably represents the time from PTT 310, or $t_{NOTIFY}$ 311 until a page could be issued if respective target addresses were sent using an SDB message on ACH 410. A typical latency might be between 100 and 600 msecs. A second latency β 421 can be calculated as noted and preferably represents the time from PTT 310, or $t_{NOTIFY}$ 311 until a page could be issued if respective target addresses were sent using a message on TCH 420. If any of the target CUs wake up in the interval between α 411 and β 421 then their address or addresses can be sent in an SDB sent on ACH 410. Otherwise, the addresses can be sent on the traffic channel or TCH 420 to, for example, base station 110 whereupon a page, notification or the like can be generated to notify the associated target CUs of the group call.

Figure 5:
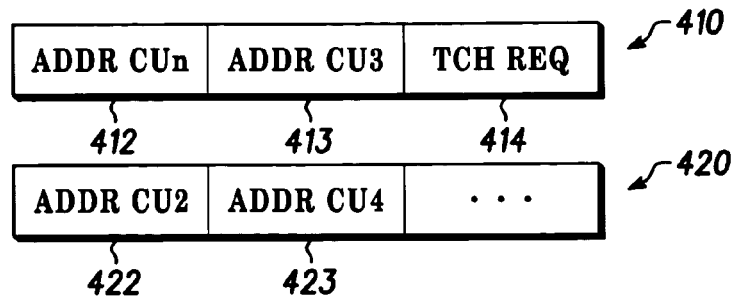
FIG. 5 is a diagram depicting exemplary information units associated respectively with notification channels in accordance with various exemplary embodiments.

In FIG. 5, it can be seen that the message, packet, or the like, such as an SDB message, sent on ACH 410 can include one or more addresses for targets which will wake up, and thus be capable of receiving a page or other notification, for example, after first latency α 411 but before second latency β 421, such as the address ADDR CU n 412 for target CU n 124, ADDR CU3 413 for target CU3 122. It will be appreciated that in order to establish the traffic channel for the group call, a traffic channel request 414 must also be sent in ACH 410. The message, packet, or the like sent on TCH 420 can include, for example, remaining addresses for targets which will not wake up until after second latency β 421 as described above, such as ADDR CU2 422 for target CU2 121, and ADDR CU4 423 for target CU4 123, and may include other information as would be appreciated by one of ordinary skill in the art.

Figure 6:
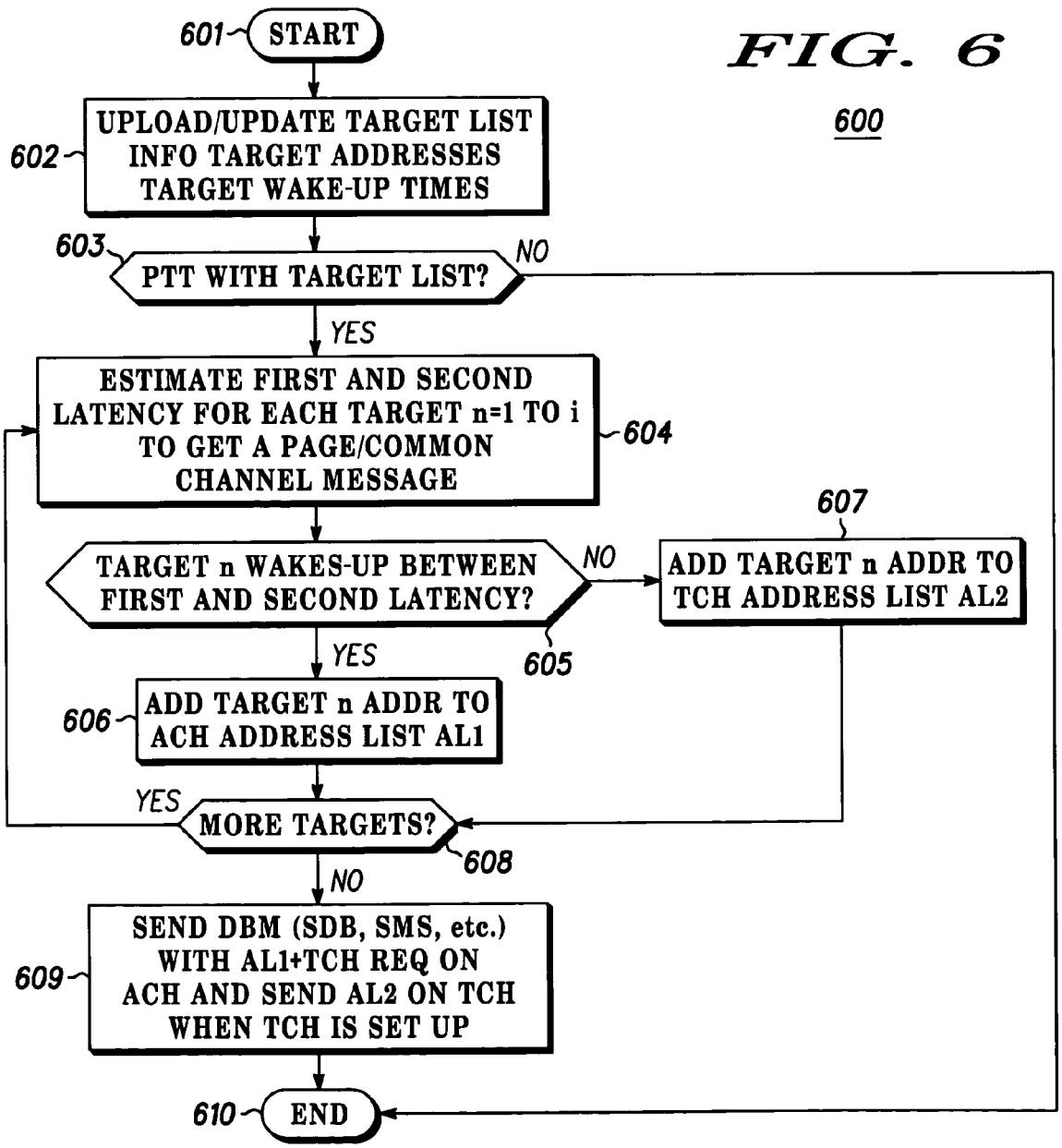
FIG. 6 is a flow chart illustrating an exemplary procedure associated with reducing delay in accordance with various exemplary embodiments.

An exemplary procedure 600 is shown in FIG. 6, and can begin at start 601. Target list information such as target addresses, wake up times, and the like may be uploaded or updated at 602 in a manner known to those of ordinary skill. When an originating CU desires to initiate a private or group call, a PTT button press or other initiating event may be tested for at 603. Normally the PTT or initiating event will be accompanied with a list of or identifying one or more targets for the private or group call being initiated. If PTT is detected at 603, during the processing interval between when the initiating event such as the PTT button press is detected and the time when an SDB can be sent on ACH 410, described above as $t_{NOTIFY}$ 311, certain calculations such as estimation of a first and second latency, and the like may be performed at 604. This will determine target addresses that can be sent in the SDB, based on for example, analysis of wake up times, that is, targets which wake up after $t_{NOTIFY}$ 311, but before, for example, second latency β 421. It will be appreciated that second latency β 421 roughly coincides with the time required to request and establish a traffic channel. The determination of second latency β 421 can also include various hypothetical calculations or estimations of traffic channel build time based on a request sent on ACH 410 with and without addresses, or the like. If no PTT is detected at 603 the procedure ends at 610, however it can be repeated thereby continuing to periodically update information associated with targets, collect information on new targets which may be added to the PTT target list and the like.

At 605 a test may be performed to determine whether based on the estimated latencies, an $n^{th}$ target wakes up between first latency α 411 and second latency β 421. If so, the address of target n may be added to the list of addresses AL1 to be sent on ACH 410 at 606, and if not, the address of target n, since wake up may be presumed to occur after second latency β 421, is added to the list of addresses AL2 to be sent on TCH 420 at 607. If more targets are available at 608, then the latencies may be estimated at 604, or alternatively, latencies for all targets may be calculated at once and the test at 605 and processes at 606 or 607 may be repeated for every target. If no more targets remain at 608, or if, as described, estimation is performed for all targets, then the respective lists AL 1 and AL 2 may be sent on ACH 410 and TCH 420 respectively at 609, whereupon the procedure may terminate, return, loop or the like at 610.

Figure 7:
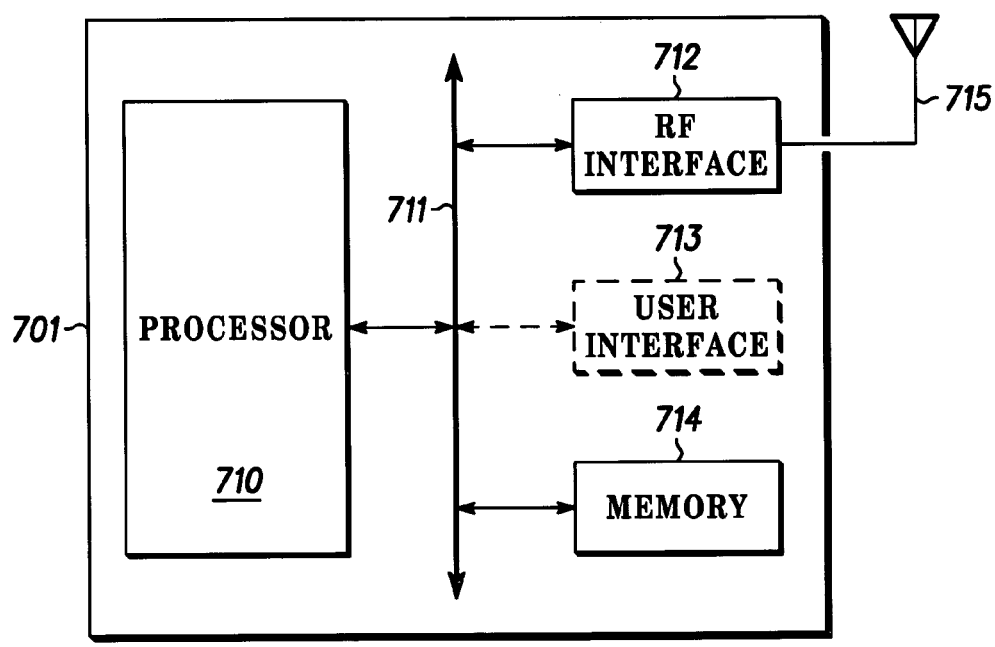
FIG. 7 is a diagram illustrating an exemplary apparatus including a processor and memory associated with reducing delay in accordance with various exemplary embodiments.

It will be appreciated that the above procedure may be implemented in a variety of ways, including as embodied in a software program containing instructions capable of being read by a computer, processor, or the like and stored in a memory. Further, various exemplary and alternative exemplary embodiments may involve an exemplary apparatus 700 as illustrated in FIG. 7. Therein, exemplary unit 701, which may be a communication unit or the like capable of participating in a private or group call, may include a processor 710, having a bus 711, RF interface 712, user interface 713 which may include a PTT button (not shown) as would be well understood by one of ordinary skill, memory 714, and antenna 715. Processor 710 may be a general purpose processor, dedicated processor or the like as would be understood by one of ordinary skill with a minimum speed requirement such that processing, for example, in accordance with the above described procedures, techniques, principals and the like can be achieved within a timeframe suitable for making determinations such as latency estimations well before anomalies such as audio clipping or the like will occur. It will also be appreciated that while elements such as RF interface 712 and user interface 713 are shown, such elements may be optional as the basic processing may be performed in accordance with the present invention with input and output information associated with RF interface 712 and user interface 713 being externally provided. Further while memory 714 is shown as a separate module within unit 701, it will be appreciated that memory 714 may be included within processor 710 as would be appreciated by one of ordinary skill.

The inventive principles and concepts discussed and described above largely with reference to Push-to-Talk communications/services, also advantageously apply to other communications between, for example, mobile units or devices for communications/services such as push to video or other file transfer applications and text messaging. With file transfer applications the target address(es) can be sent via the access channel if that will result in the respective target unit or device being assigned to or placed on the traffic channel sooner and if not the target address or remaining target addresses can be sent via the assigned traffic channel. In either event the target unit(s) will on average be assigned to the traffic channel earlier and thus file transfers can begin sooner. For some files, such as text messaging where the file size is relatively smaller, for example, SMS files or the like, the text message can be sent over the access channel, when doing so will result in the target unit being sent the text message sooner, for example a paging slot earlier.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for reducing delay associated with a call set-up for a call between an originating communication unit and a target communication unit in a radio access system (RAS), the method comprising:

initiating the call between the originating communication unit and the target communication unit prior to a channel assignment;

estimating a first latency between an initiation time associated with the call and a first time when the target communication unit is capable of receiving a notification of the call by comparing the first time with a wake-up time for the target communication unit using a time value associated with the RAS and a slot offset time associated with the target communication unit;

estimating a second latency between the initiation time and a second time when the target communication unit is capable of receiving the notification of the call by comparing the second time with the wake-up time for the target communication unit using the time value associated with the RAS and the slot offset time associated with the target communication unit; and sending an address associated with the target communication unit to the RAS on one of a first channel and a second channel based on the first latency and the second latency.

2. A method in accordance with claim 1, wherein:

the call includes a group call, the target communication unit is one of a plurality of target communication units associated with the group call, each of the plurality of target communication units having a respective address, the estimating the first latency further includes estimating a respective first latency between the initiation time and a respective first time when the each of the plurality of target communication units is capable of receiving the notification of the call, the estimating the second latency further includes estimating a respective second latency between the initiation time and a respective second time when the each of the plurality of target communication units is capable of receiving the notification of the call, and the sending the address includes sending the respective address associated with the each of the plurality of target communication units to the RAS on one of the first channel and the second channel based on the respective first latency and the respective second latency.

3. A method in accordance with claim 1, wherein the second time includes one of: a call processing time associated with the originating communication unit; a first channel message transfer time associated with the originating communication unit sending the address associated with the target communication unit to the RAS on the first channel; a first call processing time associated with the RAS; a second channel assignment time associated with the originating communication unit, the RAS, and the second channel; a second channel message transfer time associated with the originating communication unit sending the address associated with the target communication unit to the RAS on the second channel; and a second call processing associated with the RAS.

4. A method in accordance with claim 1, wherein the first time includes one of a call processing time associated with the originating communication unit, a first channel message transfer time associated with the originating communication unit sending the address associated with the target communication unit to the RAS on the first channel, and a first call processing time associated with the RAS.

5. A method in accordance with claim 1, wherein the RAS includes one of a Code Division Multiple Access (CDMA) RAS, a Global System Mobile (GSM) RAS, Universal Mobile Telecommunication System (UMTS) RAS, a Data Only (DO) RAS, a High Rate Packet Data (HRPD) RAS, a High Speed Downlink Packet Access (HSDPA) RAS, a Wireless Local Area Network (WLAN) RAS, and a Evolution Data Voice (EVDV) RAS.

6. A method in accordance with claim 1, wherein the first channel includes an access channel and the second channel includes a dedicated traffic channel.

7. A method for reducing delay in a group call setup for a group call between an originating communication unit and a plurality of target communication units in a radio access system (RAS), the method comprising:

sorting a list of addresses associated with the plurality of target communication units according to a latency value between a first time and a second time associated with each of the plurality of target communication units, the list sorted to provide one or more first addresses to be transmitted to the RAS over a first channel and one or more second addresses to be transmitted to the RAS over a second channel, the sorting performed when the group call set-up is impending; and initiating, at the first time, the group call between the originating communication unit and the plurality of target communication units by transmitting the first addresses from the originating communication unit to the RAS over the first channel.

8. A method in accordance wit claim 7, wherein the second time includes one of: a call processing time associated with the originating communication unit; a first channel message transfer time associated with the originating communication unit sending the first addresses to the RAS on the first channel; a first call processing time associated with the RAS; a second channel assignment time associated with the originating communication unit; a second channel message transfer time associated with the originating communication unit sending the second addresses to the RAS on the second channel; and a second call processing time associated with the RAS.

9. A method in accordance with claim 7, wherein the first time includes a Push To Talk (PTT) time.

10. A method in accordance with claim 7, wherein the first channel includes an access channel and the second channel includes a dedicated channel.

11. A method in accordance with claim 7, wherein the RAS includes one of: a Code Division Multiple Access (CDMA) RAS, a Global System Mobile (GSM) RAS, Universal Mobile Telecommunication System (UMTS) WAS, a Data Only (DO) RAS, a High Rate Packet Data (HRPD) RAS, a High Speed Downlink Packet Access (HSDPA) RAS, a Wireless Local Area Network (WLAN) WAS, and a Evolution Data Voice (EVDV) RAS.

12. An apparatus in a radio access system (RAS) capable of participating in a call, the apparatus comprising:

an interface capable of coupling to the RAS and a target communication unit;

a memory; and a processor coupled to the memory and the interface, the memory storing instructions for causing the processor to:

estimate a first time delay associated with completing the call with the target communication unit if an address of the target communication unit is transmitted to the RAS over a first channel and to estimate the first time delay to compare a first time with a wake up time for the target communication unit using a time value associated with the RAS and a slot offset time associated with the target communication unit; and estimate a second time delay associated with completing the call with the target communication unit if the address of the target communication unit is transmitted to the RAS over a second channel and to estimate the second time delay to compare a second time with the wake up time for the target communication unit using the time value associated with the RAS and the slot offset time associated with the target communication unit, wherein the completing the call includes a notification time when a notification of the call is capable of being received.

13. An apparatus in accordance with claim 12, wherein the instructions further cause the processor to initiate the call by sending the address associated with the target communication unit to the RAS on one of the first channel and the second channel based on one of the first time delay and the second time delay.

14. An apparatus in accordance with claim 12, wherein the first time delay and the second time delay include an elapsed time between an initiation time of the call and one of a wake up time, a Talk Permit Tone (TPT) time, and a response time when a response to the notification associated with the call is received.

15. An apparatus in accordance with claim 14, wherein the time when the call is initiated includes a Push To Talk (PTT) time.

16. An apparatus in accordance wit claim 12, wherein the RAS includes one of: a Code Division Multiple Access (CDMA) RAS, a Global System Mobile (GSM) RAS, Universal Mobile Telecommunication System (UMTS) RAS, a Data Only (DO) RAS, a High Rate Packet Data (HRPD) RAS, a High Speed Downlink Packet Access (HSDPA) RAS, a Wireless Local Area Network (WLAN) RAS, and an Evolution Data Voice (EVDV) RAS.

17. An apparatus in accordance with claim 12, wherein:

the call includes a group call, the target communication unit is one of a plurality of target communication units associated with the group call, the processor, in the estimating the first time delay is further configured to:

estimate a respective first latency associated with when each of the plurality of target communication units is capable of receiving the notification associated with the call if address information associated with the each is sent on a first channel;

estimate a respective second latency associated with when each of the plurality of target communication units is capable of receiving the notification associated with the call if the address information associated with the each is sent on a second channel, and send the address information associated with the each of the plurality of target communication units to the RAS on one of the first channel and the second channel based on one or more of the respective first latency and the respective second latency.

\* \* \* \* \*